(12) United States Patent
Tuch

(10) Patent No.: US 11,576,388 B2
(45) Date of Patent: Feb. 14, 2023

(54) PROCESS FOR PREPARING PIZZA

(71) Applicant: Eric Brian Tuch, Lemoyne, PA (US)

(72) Inventor: Eric Brian Tuch, Lemoyne, PA (US)

(*) Notice: Subject to any disclaimer, the term of this patent is extended or adjusted under 35 U.S.C. 154(b) by 0 days.

(21) Appl. No.: 16/905,800

(22) Filed: Jun. 18, 2020

(65) Prior Publication Data
US 2020/0397008 A1  Dec. 24, 2020

Related U.S. Application Data

(60) Provisional application No. 62/863,350, filed on Jun. 19, 2019.

(51) Int. Cl.
| A21D 8/06 | (2006.01) |
| A21D 8/02 | (2006.01) |
| A21D 13/47 | (2017.01) |
| A21C 9/08 | (2006.01) |
| A21C 11/02 | (2006.01) |
| A21D 13/41 | (2017.01) |

(52) U.S. Cl.
CPC ............... *A21D 8/06* (2013.01); *A21C 9/083* (2013.01); *A21C 11/02* (2013.01); *A21D 8/02* (2013.01); *A21D 13/41* (2017.01); *A21D 13/47* (2017.01)

(58) Field of Classification Search
CPC .......... A21D 8/02; A21D 8/06; A22D 113/47; A22D 113/41; A21C 9/08; A21C 9/081; A21C 9/083; A21C 11/00; A21C 11/004; A21C 11/006; A21C 11/02; A21C 11/08; A47J 37/00; A47J 37/06–0694
USPC .......... 426/292; 99/349, 388, 422, 426, 432, 99/433, 450
See application file for complete search history.

(56) References Cited

U.S. PATENT DOCUMENTS

| 4,065,581 A | * | 12/1977 | Heiderpriem | ............ | A21D 8/06 |
| | | | | | 426/138 |
| 4,273,496 A | * | 6/1981 | Papalexis | ............... | A21B 3/18 |
| | | | | | 198/483.1 |
| 4,378,729 A | | 4/1983 | Pierick | | |
| 4,464,405 A | * | 8/1984 | De Christopher | ........ | A21B 3/13 |
| | | | | | 425/395 |
| 4,701,340 A | | 10/1987 | Bratton et al. | | |
| 5,200,225 A | | 4/1993 | Apaydin | | |
| 5,417,150 A | * | 5/1995 | Kordic | ..................... | A21D 8/02 |
| | | | | | 426/144 |

(Continued)

FOREIGN PATENT DOCUMENTS

| DE | 3834166 A1 | * | 4/1990 | ............ | F24C 15/322 |
| GB | 2390525 A | * | 1/2004 | ............ | A21C 11/006 |

OTHER PUBLICATIONS

Ambitious Kitchen "How to Grill Pizza that's Crispy, Chewy and Ready in only 15 Minutes" Jun. 12, 2019 https://www.ambitiouskitchen.com/how-to-grill-pizza/ (Year: 2019).*

(Continued)

*Primary Examiner* — Drew E Becker
*Assistant Examiner* — Austin Parker Taylor
(74) *Attorney, Agent, or Firm* — Paul & Paul

(57) ABSTRACT

A process for grilling pizza includes shaping pizza dough to a predetermined configuration to provide a flattened dough, placing the shaped dough on a design bearing grate, grilling one side of the shaped pizza dough on the grate to form a design in the pizza dough, applying condiments to the grilled side, and baking the partially cooked pizza.

20 Claims, 5 Drawing Sheets

(56) References Cited

U.S. PATENT DOCUMENTS

| | | | |
|---|---|---|---|
| 5,997,924 A | 12/1999 | Olander, Jr. et al. | |
| 6,598,514 B2* | 7/2003 | Leggi | A47F 9/00 |
| | | | 126/276 |
| 6,783,782 B1* | 8/2004 | Larsen | A21C 11/12 |
| | | | 426/144 |
| 6,843,167 B1 | 1/2005 | Kanafani et al. | |
| 2003/0145740 A1* | 8/2003 | Stark | A47J 37/0786 |
| | | | 99/447 |
| 2004/0154611 A1* | 8/2004 | Beech | A21B 1/04 |
| | | | 126/273 R |
| 2010/0266729 A1* | 10/2010 | Guan | A23P 20/25 |
| | | | 426/89 |
| 2011/0209661 A1* | 9/2011 | Fritz-Jung | A21C 9/04 |
| | | | 118/696 |
| 2012/0091125 A1* | 4/2012 | McGuinness | A47J 37/067 |
| | | | 219/725 |
| 2013/0101709 A1* | 4/2013 | Rader | A23P 20/20 |
| | | | 426/231 |

OTHER PUBLICATIONS

Schulman, Amy "A History of Deep-Dish Pizza" culture-trip May 29, 2019 https://theculturetrip.com/north-america/usa/illinois/articles/a-brief-history-of-chicago-deep-dish-pizza/ (Year: 2019).*

Bauer, Elise; "How to Grill Pizza", May 17, 2015 Simply Recipes https://web.archive.org/web/20160425063436/https:/www.simplyrecipes.com/recipes/how_to_grill_pizza/ (Year: 2015).*

\* cited by examiner

PROCESS FOR PREPARING PIZZA

CROSS-REFERENCE TO RELATED APPLICATION

The present application claims the benefit of U.S. Provisional Patent Application 62/863,350, filed Jun. 19, 2019, which is incorporated herein in its entirety by reference.

BACKGROUND OF THE INVENTION

1. Field of the Invention

The present invention relates to a process for preparing pizza.

2. Brief Summary of the Prior Art

Pizza, a highly popular food, is traditionally prepared by hand in a time-consuming process. Many improvements have been proposed over the years to this process, many of which have been directed to reducing the time required to prepare the food. Conventionally, dough is formed by hand into a traditional round or rectangular shape, garnishes are applied to the surface of the dough, and the raw dough laden with the garnishes is baked in a traditional pizza oven. Proposed improvements in the preparation process are legion. For example, U.S. Pat. No. 4,378,729 discloses a method and apparatus for uniformly heating a fresh or frozen pizza. U.S. Pat. No. 4,701,340 discloses an oven for preparing pizza including three chambers and a conveyor for transporting pizza through the oven to reduce cooking time. U.S. Pat. No. 5,200,225 discloses a machine and process for quickly baking pizza using super-heated steam. U.S. Pat. No. 5,997,924 purports to automate the entire process with a self-service vending machine robotically adding user-selected garnishes to pre-made pizza crust, baking the pizza, and dispensing the result in a cardboard box. U.S. Pat. No. 6,843,167 provides a mass production technique for par-baking pizza crusts from dough and subsequently distributing frozen par-baked crusts to pizza shops for final assembly of the pies. While many different pizza preparation techniques have been proposed, the ultimate product obtained is measured against the standard of pies produced by traditional techniques, with nothing other than taste and texture to signal the process used to prepare a superior pizza. Despite the extensive efforts to improve the pizza preparation process, there is a continuing need for a process which rapidly provides a unique pizza product which itself signals to the consumer the techique employed to prepare the product.

SUMMARY OF THE INVENTION

The present invention provides an improved process for preparing a pizza. The process comprises providing pizza dough and shaping the pizza dough to a predetermined configuration to provide a flattened, shaped dough having a first side and a second side. The process also includes providing a first carrier device which has a bearing surface for contacting the pizza dough. The process further comprises placing the shaped dough on the first carrier device with the first side of the shaped dough facing the bearing surface of the first carrier device. The process further comprises grilling the shaped dough on the first carrier device to provide a pizza crust having a first side and a second side, such that the pizza crust becomes partially cooked on a first side of the pizza crust. The process further comprises providing a second carrier device having a bearing surface, and placing the second side of the partially cooked pizza crust on the bearing surface of the second carrier device, The process also comprises placing at least one additional ingredient on the first side of the partially cooked pizza crust to provide a partially cooked pizza, and baking the partially cooked pizza to provide a fully cooked pizza.

Preferably, the process further comprises placing the partially cooked pizza, resting on the second carrier device, in an oven for baking the partially cooked pizza.

Preferably, the oven includes an entrance opening and an exit opening, and a conveyor for conveying the partially cooked pizza from the entrance opening to the exit opening. The process further comprises conveying the partially cooked pizza from the entrance opening to the exit opening of the oven.

Preferably, the process further includes engaging the second carrier device with the conveyor to transport the partially cooked pizza from the entrance opening to the exit opening.

Preferably, the process further comprises providing an open flame in the oven to bake the partially cooked pizza.

Preferably, the process further comprises providing a refractory lining within the oven to retain heat within the oven.

Preferably, the process further comprises providing an assembly station for receiving the partially cooked pizza crust.

Preferably, the process further comprises placing the partially cooked pizza crust in the assembly station.

Preferably, the process further comprises providing a sauce receptacle in the assembly station.

Preferably, the process further comprises placing sauce in the sauce receptacle and applying sauce from the sauce receptacle on the partially cooked pizza crust.

Preferably, the process further comprises providing a plurality of garnish receptacles in the assembly station.

Preferably, the process further comprises placing garnishes in at least some of the garnish receptacles, and applying at least one garnish, such as tomato sauce on the partially cooked pizza crust.

Preferably, the process further comprises providing a decorative design on the bearing surface of the first carrier device.

Preferably, the process further comprises grilling the shaped dough on the first carrier device to provide a decorative design on the first side of the pizza crust.

Preferably, the process further comprises providing a first grate as the bearing surface on the first carrier device for suspending the pizza dough on the first carrier device.

Preferably, the process further comprises providing a second grate as the bearing surface on the second carrier device for suspending the partially cooked pizza crust in the oven.

In one aspect of the process of the present invention, the predetermined configuration of the dough is round, and in another aspect, the predetermined configuration of the dough is rectangular.

Preferably, wherein the assembly station includes a heating mechanism for the sauce receptacle, and further comprising heating the sauce receptacle.

In another aspect, the present invention provides a process for preparing a pizza, in which aspect the process includes providing pizza dough and shaping the pizza dough to a predetermined configuration to provide a flattened shaped dough having a first side and a second side. In this aspect, the present invention further includes providing a carrier device, the carrier device having a bearing surface for contacting the pizza dough and placing the shaped dough on the carrier device, with the first side of the shaped dough facing the bearing surface of the carrier device. In this aspect of the present invention, the bearing surface of the carrier device is provided with a three-dimensional decorative design. In this aspect, the present invention further comprises grilling the shaped dough on the carrier device to provide a pizza crust having a first side and a second side, the pizza crust becoming partially cooked on the first side of the pizza crust. In this aspect of the present invention, grilling the shaped dough on the carrier device provides a decorative design on the first side of the pizza crust. In this aspect, the present invention further includes further cooking the pizza crust to provide a fully cooked pizza.

In yet another aspect, the present invention provides apparatus for preparing pizza. In this aspect, the present invention provides a grate for grilling pizza dough. The grate includes a bearing plate having a plurality of openings. The bearing plate includes a generally flat central surface, and a rim extending from the central surface. The rim extends at an angle from the plane of the central surface. The grate also includes a base extending from the bearing plate for supporting the bearing plate in a horizontal orientation, and for positioning the bearing plate above the surface of a grill such that the rim of the bearing plate does not contact the grill. Preferably, the rim extends at an angle of from about 15 degrees to 85 degrees, more preferably from about 30 degrees to 60 degrees, and still more preferably about 45 degrees.

DETAILED DESCRIPTION

Figure 1:
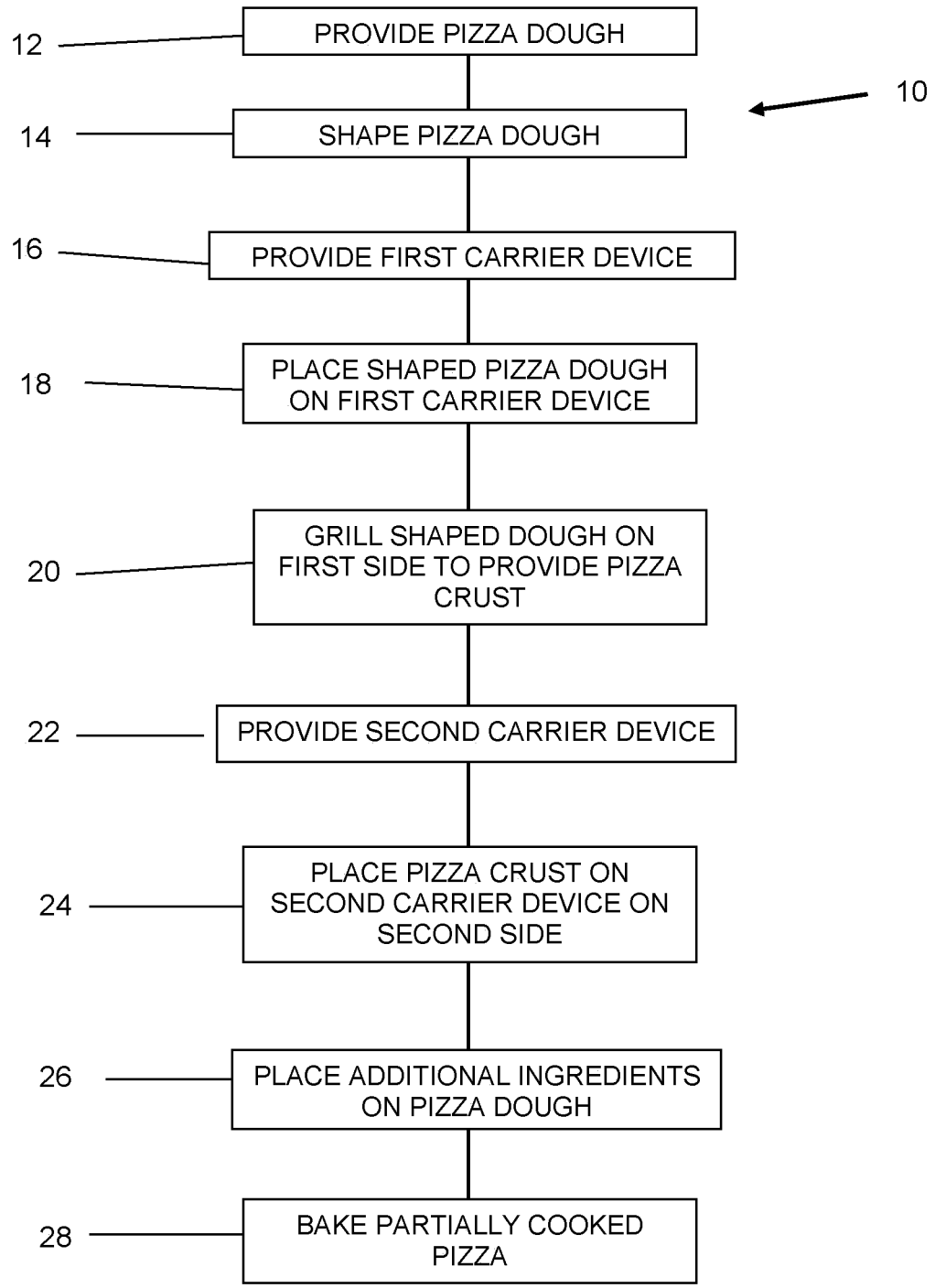
FIG. 1 is a schematic representation of an embodiment of the process of the present invention.

Referring now to the figures in which like reference numerals represent like elements in each of the several views, there is shown in FIG. 1 a schematic representation of a presently preferred embodiment 10 of the process of the present invention. In this embodiment, the process first includes providing 12 pizza dough as by preparing the dough from raw ingredients, thawing frozen dough obtained from an off-site source, or the like. The dough is then shaped 14 to a predetermined configuration, such as a circular, rectangular or square shape, to provide a flattened shaped dough having a first side and a second side. Traditional methods for shaping pizza dough can be employed. The process further includes providing 16 a first carrier device 140, such as depicted in the perspective view of FIG. 3. The first carrier device 140 has a bearing surface 142 for contacting the pizza dough. The shaped dough is placed 18 on the first carrier device 140 with the first side of the shaped dough facing the bearing surface 142 of the first carrier device 140. Next, the shaped dough is grilled 20 on the first carrier device to provide a pizza crust having a first side and a second side. Thus, the pizza crust becoming partially cooked on a first side of the pizza crust. Next, a second carrier device 170 having a bearing surface 172 is provided 22, and the second side of the partially cooked pizza crust is placed 24 on the bearing surface 172 of the second carrier device 170. That is, the partially cooked pizza crust is flipped over such that the grilled, partially cooked side of the pizza crust is on top. Next, additional ingredients are placed 26 on the first side of the partially cooked pizza crust to provide a partially cooked pizza. Ingredients can include grated cheese such as mozzarella, tomato sauce, cooked or raw onions, meats such as sausage and pepperoni, anchovies, and the like. Finally, the partially cooked pizza is baked 28 to provide a fully cooked pizza.

Figure 2:
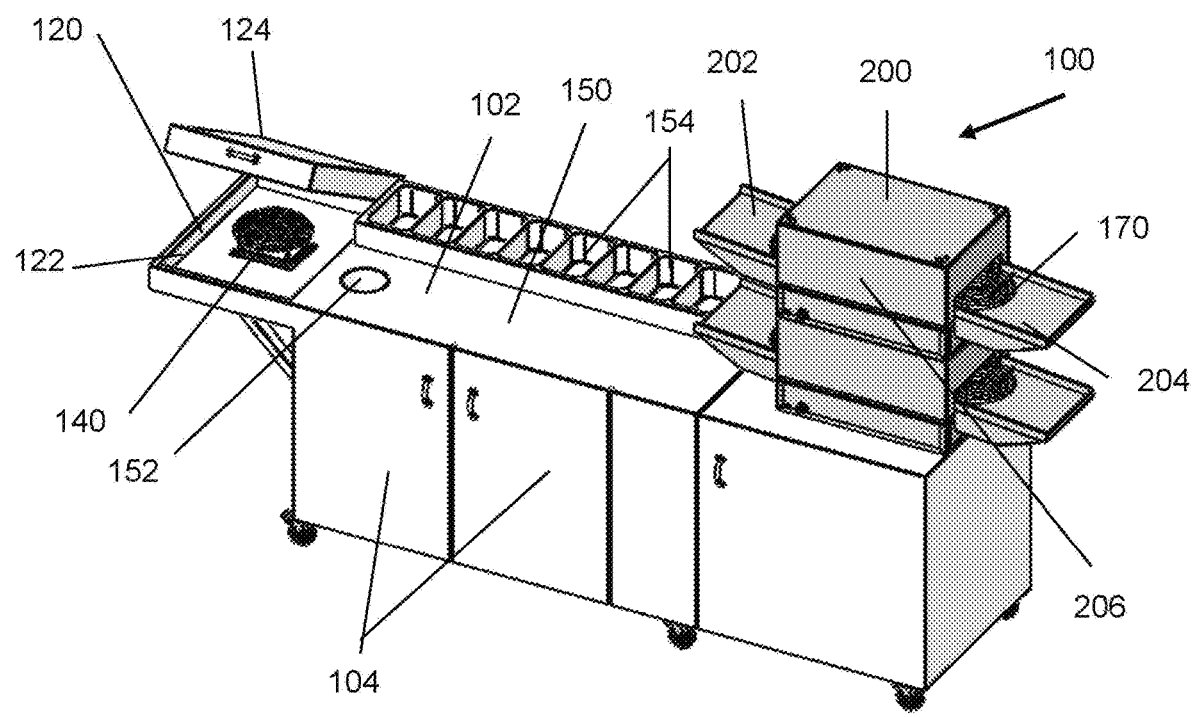
FIG. 2 is a perspective view of an apparatus for preparing pizza according to the present invention.

An apparatus 100 for carrying out the process of the present invention is depicted in the perspective view of FIG. 2. The apparatus 100 includes a working surface 102 atop a plurality of storage cabinets 104 for supplies. One end of the pizza preparation apparatus 100 is provided with a grill station 120 including a grill 122 optionally provided with a heat-retaining cover 124. In operation, a first carrier device 140 carrying a suitably shaped piece of pizza dough is placed on top of the grill 122 in the grill station 120, and the dough is grilled to provide a partially cooked pizza crust. The partially cooked pizza crust is then inverted and transferred to the second carrier device 170 such that the grilled side of the partially cooked pizza crust faces upward. The second carrier device 170 is positioned in an assembly station 150 which includes a portion of the working surface 102, as well as sauce receptacle 152 is optionally heated with a suitable heating mechanism 156 (not shown) such as an electrical resistance heater, and a plurality of garnish receptacles 154, which are optionally refrigerated, filled with suitable pizza toppings or garinshes such as grated cheese, onions, mushrooms, anchovies, sweet peppers, hot peppers, ground sausage, sliced pepperoni, and the like. Additional ingredients selected from among the garnish receptacles 154 are arranged or placed 26 on the partially cooked pizza crust as desired. The partially cooked pizza crust, adorned with the additional ingredients is then placed in a baking station or oven 200 at a second end of the apparatus 100, and baked 28 to provide a fully cooked pizza. In a presently preferred embodiment, the apparatus 100 is provided with a plurality of stackable ovens 200 permitting multiple pizzas to be baked simultaneously.

Figure 3:
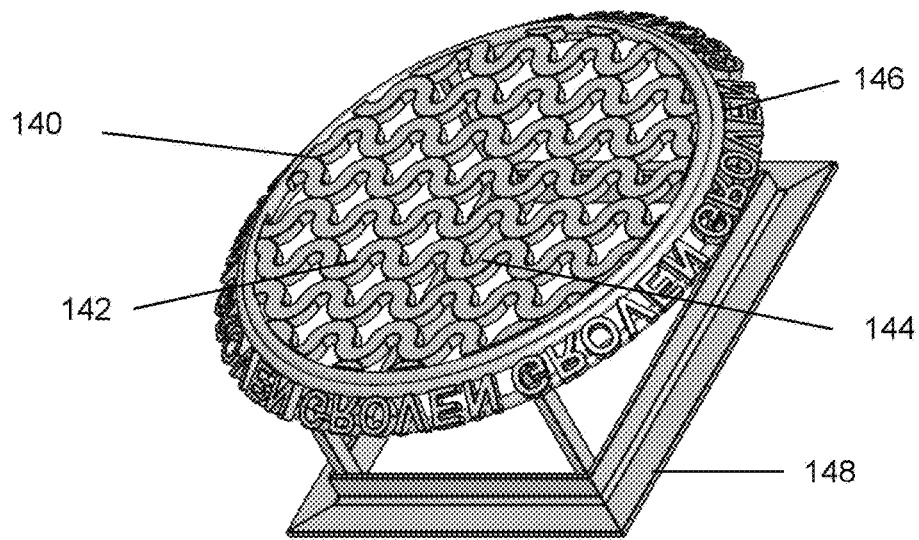
FIG. 3 is a perspective view of a first carrier device for use in the process of the present invention.

As shown in the perspective view of FIG. 3, the first carrier device 140 includes a first bearing surface or grate 142 provided with an ornamental design, as well as a supporting stand 148 for spacing the bearing surface 142 carrying the pizza dough from the surface of the grill 122.

During the grilling process, the design formed by the bearing surface 142 is at least partially transferred to the surface of the pizza dough contacting the bearing surface 142 of the first carrier device 140, The design can be strictly ornamental, or may optionally include information identifying the source of the pizza, such as the name or logo of a restaurant or "fast food" chain providing the pizza. The first bearing surface 142 includes a generally flat central portion 144 which is at least partially bounded at the outward edge of the central portion 144 by a generally downwardly projecting rim 146. Preferably, the pizza dough is sized and shaped such that when the pizza dough is applied to the bearing surface 142, the pizza dough extends over the edge of the flat central portion 144 and drapes over the rim 146. When the partially cooked pizza dough is inverted after grilling on the first carrier device 140, the portion of the partially cooked pizza dough that draped over the rim 146, that is the edge of the pizza dough, now upstands at an angle from the a generally flat central portion of the partially cooked pizza dough. Indicia that has been seared onto the edge of the pizza dough can remain visible even after the central portion of the partially cooked pizza dough has been covered with condiments and the partially cooked pizza dough has been baked in the oven, thus providing an opportunity for branding.

Figure 4:
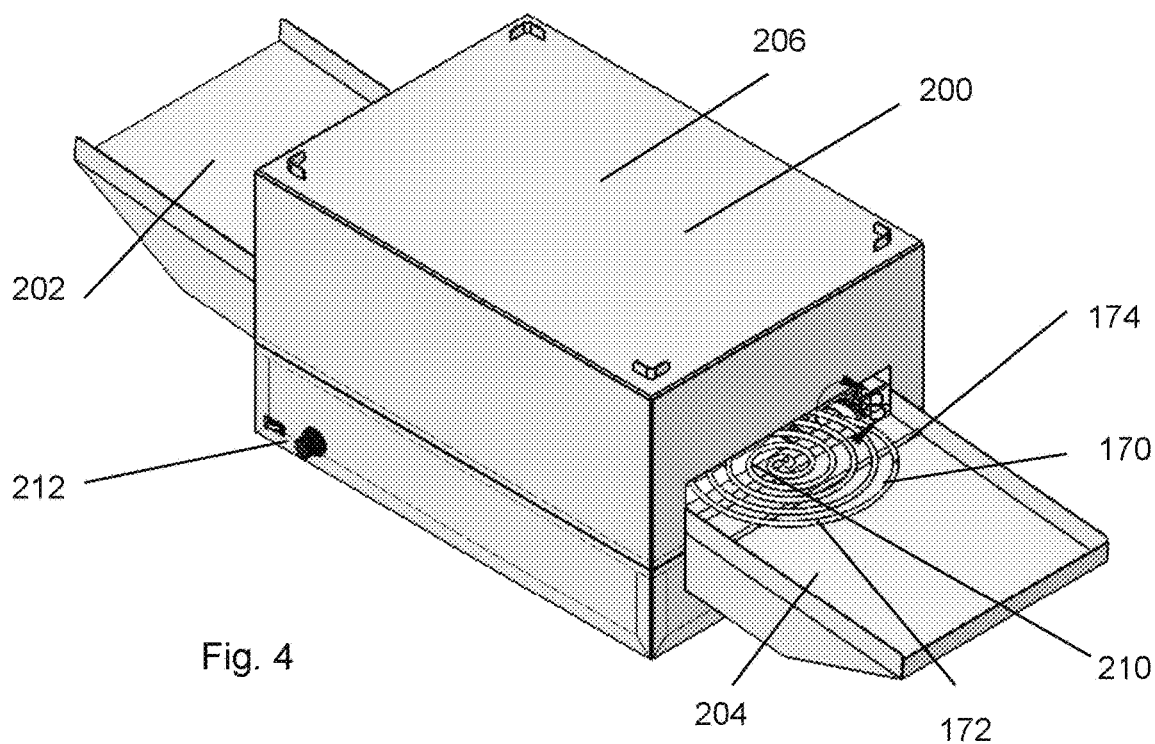
FIG. 4 is a perspective view of an oven for use in the process of the present invention.

As shown in the perspective view of FIG. 4, the oven 200 includes an entrance ramp 202 and an exit ramp 204 arranged on either side of a central portion 206 provided with an entrance opening 208 (FIG. 6) to permit a second carrier device 170 bearing a partially cooked pizza to enter the central portion 206, and an exit opening 210 to permit a second carrier device 170 bearing a corresponding fully cooked pizza to leave the central portion 206. As best seen in the side elevational view of FIG. 5, the entrance ramp 202 and the exit ramp 204 are each slightly inclined from the horizontal to assist respectively in feeding a second carrier device 170 into the central portion 206 of the oven 200 through the entrance opening 208 and removing a second carrier device 170 from the central portion 206 of the oven 200 through the exit opening 210.

Figure 5:
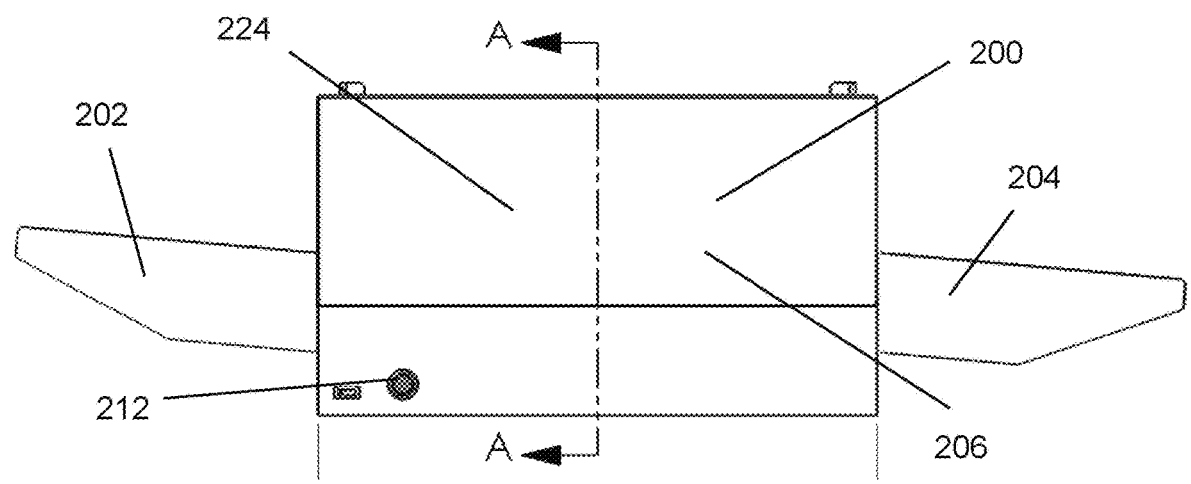
FIG. 5 is a side elevation view of the oven of FIG. 4.
Figure 6:
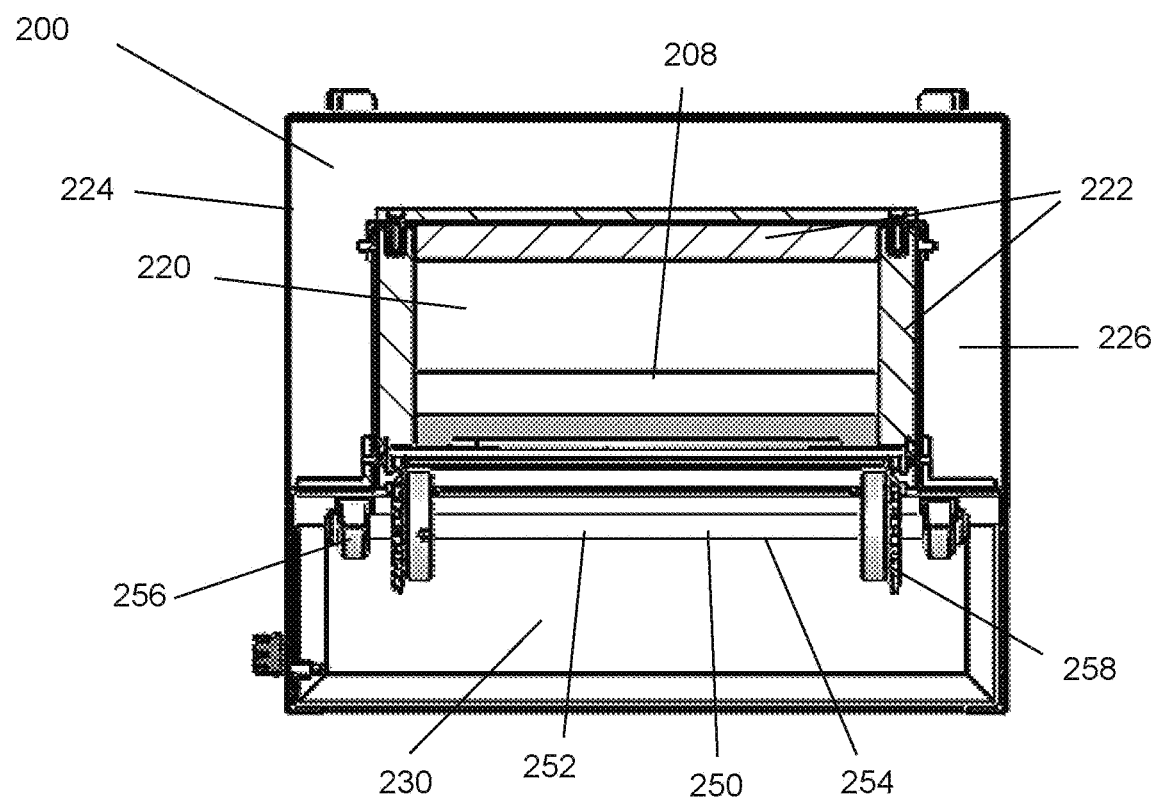
FIG. 6 is a sectional elevation view taken along the line A-A of FIG. 5.
Figure 7:
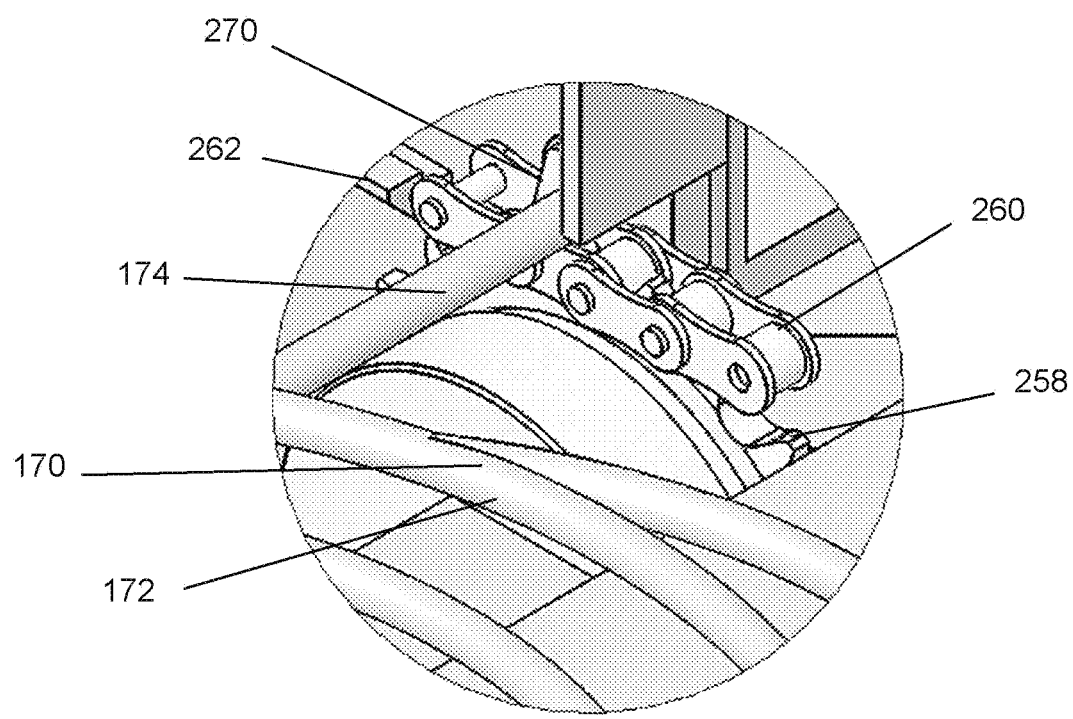
FIG. 7 is a fragmentary enlarged perspective view of the detail B of FIG. 5.
Figure 9:
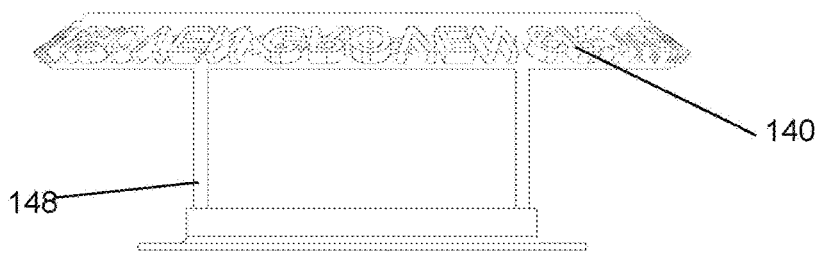
FIG. 9 is a front elevational view of the first carrier device of FIG. 3.
Figure 10:
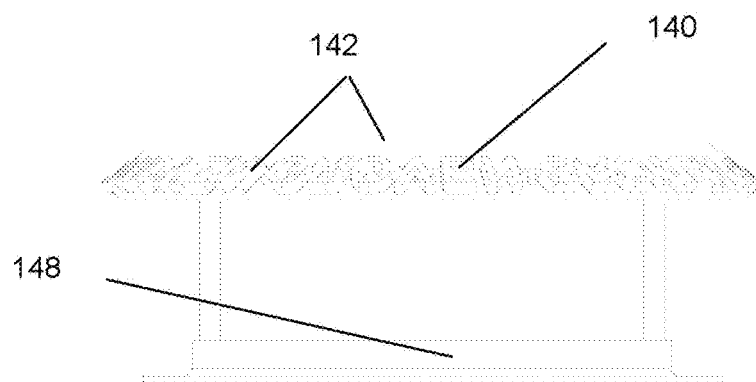
FIG. 10 is a side elevational view of the first carrier device of FIG. 3.
Figure 11:
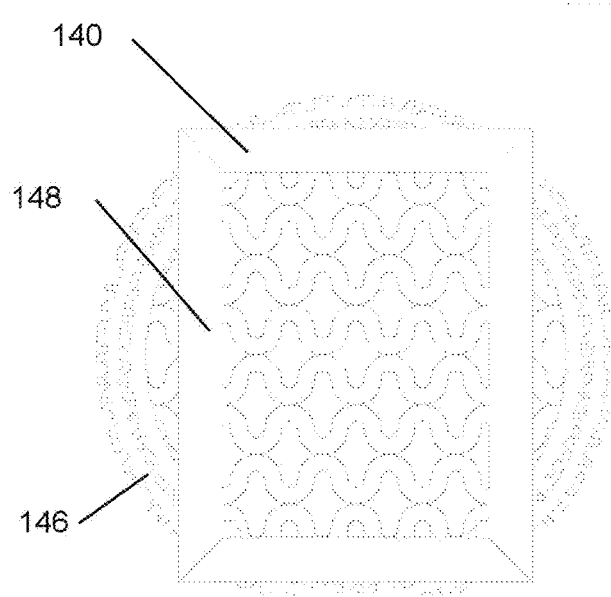
FIG. 11 is a bottom plan view of the first carrier device of FIG. 3.
Figure 8:
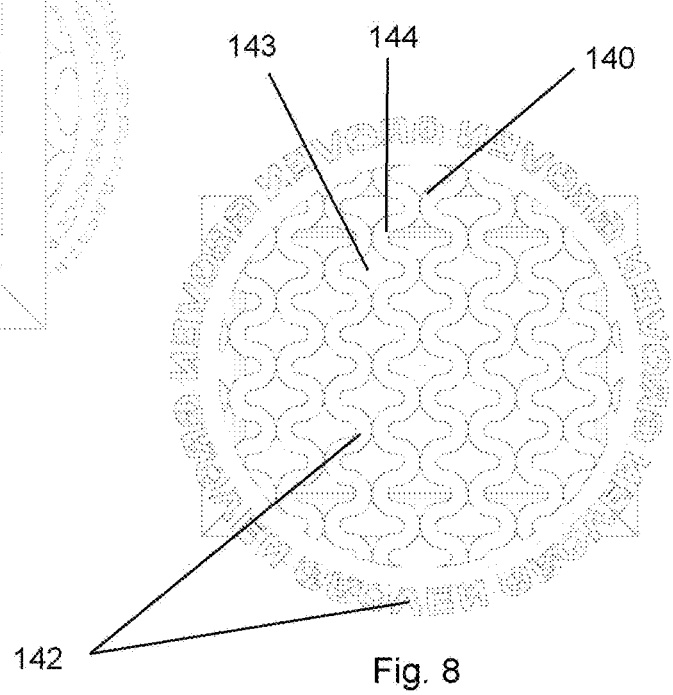
FIG. 8 is a top plan view of the first carrier device of FIG. 3.

As shown in the sectional elevational view of FIG. 6, taken along the line A-A of FIG. 5, the central portion 206 of the oven 200 includes a cooking chamber 220 lined with heat-retaining refractory material 222 such as a heat-retaining ceramic enclosed within an outer sheet metal case 224 preferably formed from stainless steel or a similar material. The cooking chamber is preferably enclosed at least on the bottom and sides with an integral inner shell. An insulative space 226 extends between the outer case 224 and the inner shell and heat-retaining refractory material, the insulative space 226 being optionally filled with an insulative material. A service chamber 230 is provided in the central portion 206 of the oven 200 beneath the cooking chamber 220. The service chamber 230 is provided with suitable heat-providing elements such as one or more gas burners (not shown) to provide an open flame, or the like. In addition, the service chamber is provided with an electric motor, suitable wiring for controlling the motor, plumbing for providing gas to the burners, etc. (not shown). A conveyor or transport mechanism 250 is provided between the cooking chamber 220 and the service chamber 230 for moving a second carrier device 170 from the entrance opening 208 to the exit opening 210 of the oven 200. The transport mechanism 250 includes a plurality of transport units 252 each including a central axle 254 mounted on a pair of bearings 256 at either end of the axle 254. Each transport unit 252 includes a toothed wheel or gear 258 mounted proximate either end of the central axle 254 for engaging a pair of chains 260. In a presently preferred embodiment, a first transport unit 252 is mounted proximate the entrance 208 (FIG. 6) to the oven 200 and a second transport unit 252 is mounted proximate the exit 210 of the oven 200 (not shown). At least one of the chains 260 is driven by a suitable electric motor through a suitable drive train (not shown). The chains 260 are supported by guide bars 262 extending between the first and second transport units 252 and each of the chains 260 provided with a plurality of upstanding cogs 270, as can be seen in the enlarged fragmentary detail perspective view of FIG. 7, for engaging a second carrier device 170 to transport the second carrier device 170 from the entrance 208 of the oven 200 to the exit 210 of the oven 200. The heat applied to the oven 200 and the rate of transport through the oven 200 are adapted to provide fully cooked pizza and are variable with suitable controls 212 (FIG. 4).

Preferably, the second carrier device 170 is formed from stainless steel rod or some similar material into a shape which permits good heat transfer to the bottom of the partially cooked pizza as it is transported through the oven 200 and which fully supports the partially cooked pizza. Thus, in the case of a round partially cooked pizza, the stainless steel rod may be formed into a spiral shape as shown in FIG. 4 to form a bearing surface 172. The second carrier device 170 may also include a pair of spaced parallel stainless steel support rods 174 welded to the underside of the spiral bearing surface 172 and extending from either side of the spiral bearing surface 172 for engaging the upstanding cogs 270 of the chains 260 of the conveyor 250.

As best seen in the plan and elevational views of FIG. 8-11, the first carrier device or grate 140 includes a bearing plate 142 having a plurality of openings 143. The bearing plate includes a generally flat central surface portion 144, and a rim 146 extending from the central surface portion 144. The rim 146 extends at an angle from the plane of the central surface portion 144. The grate 140 also includes a base or stand 148 extending from the bearing plate 142 for supporting the bearing plate 142 in a horizontal orientation, and for positioning the bearing plate 142 above the surface of a grill such that the rim 146 of the bearing plate does not contact the grill. Preferably, the rim 146 extends at an angle of from about 15 degrees to 85 degrees, more preferably from about 30 degrees to 60 degrees, and still more preferably about 45 degrees. Preferably, the openings 143 are arranged in an ornamental design, form text to convey information, or are arranged in an ornamental design which includes text.

When raw pizza dough is placed on the grate 140, the portions of the dough adjacent the openings 143 in the bearing plate cook at a different rate than those portions of the dough surface actually in contact with surface of the bearing plate 144, permitting a pattern corresponding to the pattern of the openings in the bearing plate to be seared onto the surface of the pizza dough.

Various modifications can be made in the details of the various embodiments of the process and apparatus of the present invention, all within the scope and spirit of the invention as defined by the appended claims

The invention claimed is:

1. Process for preparing a pizza, the process comprising:
   providing pizza dough;
   shaping the pizza dough to a predetermined configuration to provide a flattened shaped dough having a first side and a second side;
   providing a first carrier device, the first carrier device having a bearing surface for contacting the pizza dough and a supporting stand for spacing the bearing surface carrying the pizza dough from the surface of a grill;
   placing the shaped dough on the first carrier device, the first side of the shaped dough facing the bearing surface of the first carrier device;

grilling the shaped dough on the first carrier device to provide a pizza crust having a first side and a second side, the pizza crust becoming partially cooked on the first side of the pizza crust;

providing a second carrier device having a bearing surface;

placing the second side of the partially cooked pizza crust on the bearing surface of the second carrier device, placing additional ingredients on the first side of the partially cooked pizza crust to provide a partially cooked pizza; and baking the partially cooked pizza to provide a fully cooked pizza.

2. A process according to claim 1, further comprising placing the partially cooked pizza resting on the second carrier device in an oven for baking the partially cooked pizza.

3. A process according to claim 2, wherein the oven includes an entrance opening and an exit opening, and a conveyor for conveying the partially cooked pizza from the entrance opening to the exit opening, the process further comprising conveying the partially cooked pizza from the entrance opening to the exit opening.

4. A process according to claim 3, further including engaging the second carrier device with the conveyor to transport the partially cooked pizza from the entrance opening to the exit opening.

5. A process according to claim 4, further comprising providing an open flame in the oven to bake the partially cooked pizza.

6. A process according to claim 5, further comprising providing a refractory lining within the oven to retain heat within the oven.

7. A process according to claim 1, further comprising providing an assembly station for receiving the partially cooked pizza crust.

8. A process according to claim 7, further comprising placing the partially cooked pizza crust in the assembly station.

9. A process according to claim 7, further comprising providing a sauce receptacle in the assembly station.

10. A process according to claim 9, further comprising placing sauce in the sauce receptacle and applying sauce from the sauce receptacle on the partially cooked pizza crust.

11. A process according to claim 7, further comprising providing a plurality of garnish receptacles in the assembly station.

12. A process according to claim 11, further comprising placing garnishes in at least some of the garnish receptacles, and applying at least some garnishes on the partially cooked pizza crust.

13. A process according to claim 1, further comprising providing a decorative design on the bearing surface of the first carrier device.

14. A process according to claim 13, wherein grilling the shaped dough on the first carrier device provides a decorative design on the first side of the pizza crust.

15. A process according to claim 1, further comprising providing a first grate as the bearing surface on the first carrier device for suspending the pizza dough on the first carrier device.

16. A process according to claim 1, further comprising providing a second grate as the bearing surface on the second carrier device for suspending the partially cooked pizza crust in the oven.

17. A process according to claim 1, wherein the predetermined configuration is round.

18. A process according to claim 1, wherein the predetermined configuration is rectangular.

19. A process according to claim 9, wherein the assembly station includes a heating mechanism for the sauce receptacle, further comprising heating the sauce receptacle.

20. Process for preparing a pizza, the process comprising:
providing pizza dough;

shaping the pizza dough to a predetermined configuration to provide a flattened shaped dough having a first side and a second side;

providing a carrier device, the carrier device having a bearing surface for contacting the pizza dough, and a supporting stand for spacing the bearing surface carrying the pizza dough from the surface of the grill;

placing the shaped dough on the carrier device, the first side of the shaped dough facing the bearing surface of the carrier device; the bearing surface of the carrier device being provided with a three-dimensional decorative design;

grilling the shaped dough on the carrier device to provide a pizza crust having a first side and a second side, the pizza crust becoming partially cooked on the first side of the pizza crust, wherein grilling the shaped dough on the carrier device provides a decorative design on the first side of the pizza crust; and further cooking to provide a fully cooked pizza.

\* \* \* \* \*